United States Patent
Lee et al.

(10) Patent No.: US 12,377,733 B2
(45) Date of Patent: Aug. 5, 2025

(54) VEHICLE EQUIPPED WITH ELECTRIC MOTOR AND METHOD OF CONTROLLING REGENERATIVE BRAKING FOR THE SAME

(71) Applicants: Hyundai Motor Company, Seoul (KR); Kia Corporation, Seoul (KR)

(72) Inventors: Yong Hoon Lee, Incheon (KR); Hyun Woo Lim, Hwaseong-si (KR); Joon Shik Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 838 days.

(21) Appl. No.: 17/401,483

(22) Filed: Aug. 13, 2021

(65) Prior Publication Data
US 2022/0063417 A1     Mar. 3, 2022

(30) Foreign Application Priority Data
Aug. 26, 2020   (KR) .................. 10-2020-0108025

(51) Int. Cl.
*B60L 7/26*     (2006.01)
(52) U.S. Cl.
CPC ..................... *B60L 7/26* (2013.01)
(58) Field of Classification Search
CPC ........ B60L 7/18; B60L 15/2009; B60T 13/12; B60T 13/74; B60T 8/17; B60T 8/321
See application file for complete search history.

(56) References Cited

U.S. PATENT DOCUMENTS

| 11,376,967 | B2* | 7/2022 | Nakata | B60T 13/586 |
| 2005/0269875 | A1* | 12/2005 | Maki | B60T 8/38 303/152 |
| 2012/0056470 | A1* | 3/2012 | Kim | B60W 10/188 303/3 |

FOREIGN PATENT DOCUMENTS

| CN | 109562748 A * | 4/2019 | .......... B60L 15/2009 |
| JP | H1178839 A * | 3/1999 | |
| JP | 5370594 B2 | 12/2013 | |
| JP | 2016-028913 A | 3/2016 | |
| KR | 10-1566751 B1 | 11/2015 | |
| KR | 10-2020-0029788 A | 3/2020 | |
| WO | WO-2016158485 A1 * | 10/2016 | .......... B60L 15/2009 |

* cited by examiner

*Primary Examiner* — Vishal R Sahni
(74) *Attorney, Agent, or Firm* — Morgan, Lewis & Bockius LLP

(57) ABSTRACT

A braking control method of an electrified vehicle provided with an electric motor as a driving source may include the steps of starting regenerative braking when a required braking amount is obtained; determining a minimum transition time which is a minimum time required for braking transition from the regenerative braking to hydraulic braking according to a maximum response slope of a hydraulic braking device of the vehicle; determining braking deceleration according to the required braking amount and a road surface condition; determining a start vehicle speed of the braking transition according to the minimum transition time, the braking deceleration, and an end vehicle speed of the braking transition; and starting the braking transition upon determining that the start vehicle speed of the braking transition is reached during the regenerative braking.

13 Claims, 4 Drawing Sheets

VEHICLE EQUIPPED WITH ELECTRIC MOTOR AND METHOD OF CONTROLLING REGENERATIVE BRAKING FOR THE SAME

The present application claims priority to Korean Patent Application No. 10-2020-0108025, filed on Aug. 26, 2020, the entire contents of which is incorporated herein for all purposes by this reference.

BACKGROUND OF THE INVENTION

Field of the Invention

The present invention relates to a vehicle provided with an electric motor capable of more efficient regenerative braking, and a regenerative braking control method therefor.

Description of Related art

In a vehicle provided with a general internal combustion engine, deceleration is performed through a hydraulic braking device disposed on an individual wheel when a driver operates a brake pedal or a specific controller determines a deceleration. According to the hydraulic braking device, a brake pad is contacted with a disk or drum rotating together with a wheel by applying hydraulic pressure and braking is occurred through friction, and all kinetic energy of the vehicle is converted into heat energy and is discarded. In addition, in the hydraulic braking system, there is a gap between the drum or disk and the brake pad. In some models, the gap is narrowed in advance through the application of atmospheric hydraulic pressure in an expected braking situation, but, in general, since the gap starts to be narrowed from the point when hydraulic pressure is applied. There is a delay until friction starts, so the responsiveness is not good.

In contrast, a vehicle provided with an electric motor as a driving source (hereinafter, referred to as an "electrified vehicle" for convenience), for example, an electric vehicle (EV), a hybrid electric vehicle (HEV), a fuel cell electric vehicle (FCEV) and the like can charge a battery by converting kinetic energy into electrical energy during braking, and this is called braking energy regeneration or regenerative braking. Therefore, when the regenerative braking is actively used, fuel economy is improved through the reuse of recovered energy, and regenerative braking torque is generated immediately through electrical control, so that responsiveness is also fast compared to the hydraulic braking. However, the available amount of regenerative braking varies depending on the state of the electric motor or battery, and if there is a request for braking that exceeds the available amount of regenerative braking, the electrified vehicle is also provided with a hydraulic braking system to compensate for the insufficient braking amount compared to the total braking amount. In addition, in the electrified vehicle for maintaining a stable stop state after a vehicle speed reaches zero, the regenerative braking is performed at the beginning of braking according to the braking situation, but the hydraulic braking is intervened at the end of braking and the regenerative braking is released. The intervention/release process between the regenerative braking and the hydraulic braking according to such braking progress may be referred to as "braking transition".

FIG. 1 shows an example of a braking transition process between general regenerative braking and hydraulic braking.

In FIG. 1, graphs are shown at the top and bottom respectively. The two graphs share a horizontal axis representing time, but the vertical axis of the upper graph represents a braking torque and the vertical axis of the lower graph represents a vehicle speed.

Referring to FIG. 1, in an initial braking period, an allowable amount of regenerative braking is used to the maximum. When the braking transition starts as a vehicle speed decreases, the regenerative braking amount decreases and the hydraulic braking amount increases within the range in which the sum of the regenerative braking amount and the hydraulic braking amount satisfies the required braking amount.

At this time, due to the responsiveness of the hydraulic braking device, the regenerative braking amount decreases at a certain slope and the hydraulic braking amount increases at a corresponding slope according to the size of the required braking amount (i.e., required braking torque) in the braking transition process.

Depending on the size of the required braking amount, the braking type may be divided into three stages: a hard braking, an intermediate braking, and a light braking. According to the slope determined in advance for each stage, the regenerative braking amount is reduced and the hydraulic braking amount is increased. However, in a general electrified vehicle, the start time and end time of the braking transition are determined as a vehicle speed. In the case of FIG. 1, regardless of the braking type, the start of the braking transition is made of around 10 kph, and the end of the braking transition is made of around 3 kph. Accordingly, the length of the section in which the braking transition is performed may be different for each braking type.

However, when such braking transition is performed, the start vehicle speed of the braking transition is fixed. Accordingly, the regenerative braking amount decreases early even in the light braking stage where there is a relatively sufficient time margin for the braking transition control, so that the regenerative braking energy is reduced compared to the total braking energy, thereby decreasing efficiency.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle provided with an electric motor configured for more efficient regenerative braking, and a regenerative braking control method therefor.

The present invention is to provide a vehicle provided with an electric motor configured for increasing regenerative braking energy by varying a start point of braking transition according to a situation, and a regenerative braking control method therefor.

The technical problems to be achieved in various exemplary embodiments of the present invention are not limited to the technical problems mentioned above, and other technical problems that are not mentioned will be clearly understood by those of ordinary skill in the technical field to which various exemplary embodiments of the present invention belongs from the following description.

To solve the technical problems above, the braking control method of an electrified vehicle provided with an electric motor as a driving source according to various exemplary embodiments of the present invention may include the steps of starting regenerative braking when a required braking amount is obtained; determining a minimum transition time which is a minimum time required for braking transition from the regenerative braking to hydraulic braking according to a maximum response slope of a hydraulic braking device of the vehicle; determining braking deceleration according to the required braking amount and a road surface condition; determining a start vehicle speed of the braking transition according to the minimum transition time, the braking deceleration, and an end vehicle speed of the braking transition; and starting the braking transition upon determining that the start vehicle speed of the braking transition is reached during the regenerative braking.

In addition, the electrified vehicle provided with an electric motor with a driving source according to various exemplary embodiments of the present invention may include a hydraulic braking device of the vehicle; a first controller to control the hydraulic braking device; a second controller to control the electric motor; and a third controller to control the first and second controllers so that regenerative braking is started when a required braking amount is obtained, a minimum transition time which is a minimum time required for braking transition from the regenerative braking to hydraulic braking is determined based on a maximum response slope of the hydraulic braking device, braking deceleration is determined based on the required braking amount and a road surface condition, a start vehicle speed of braking transition is determined based on the minimum transition time, the braking deceleration, and an end vehicle speed of braking transition, and the braking transition is started upon determining that the start vehicle speed of the braking transition is reached during the regenerative braking.

A vehicle provided with an electric motor related to at least various exemplary embodiments of the present invention configured as described above can perform more efficient regenerative braking.

It is possible to maximize a regenerative braking energy by determining the time required for braking transition according to a situation and determining a start vehicle speed of the braking transition accordingly.

The effects obtainable as various exemplary embodiments of the present invention are not limited to the above-mentioned effects, and other effects not mentioned may be clearly understood by those of ordinary skill in the art from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
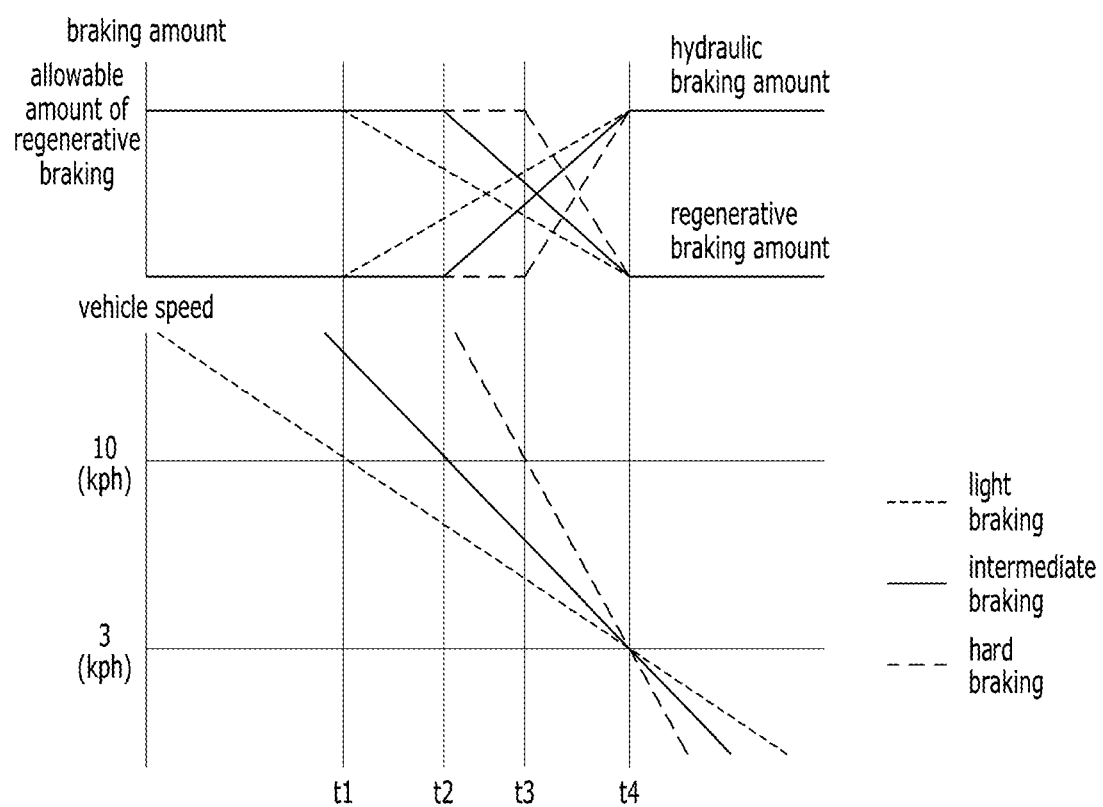
FIG. 1 shows an example of a braking transition process between general regenerative braking and hydraulic braking.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings so that those of ordinary skill in the art may easily implement the present invention. However, the present invention may be implemented in various different forms and is not limited to the exemplary embodiments described herein. In the drawings, the parts irrelevant to the description are omitted to clearly describe the present invention, and similar reference numerals are attached to similar parts throughout the specification.

Throughout the specification, when a part "includes" a certain component, it means that other components may be further included rather than excluding other components unless specifically stated to the contrary. In addition, the parts denoted by the same reference numbers throughout the specification mean the same components.

The braking transition concept according to various exemplary embodiments of the present invention will be described with reference to FIG. 2.

Figure 2:
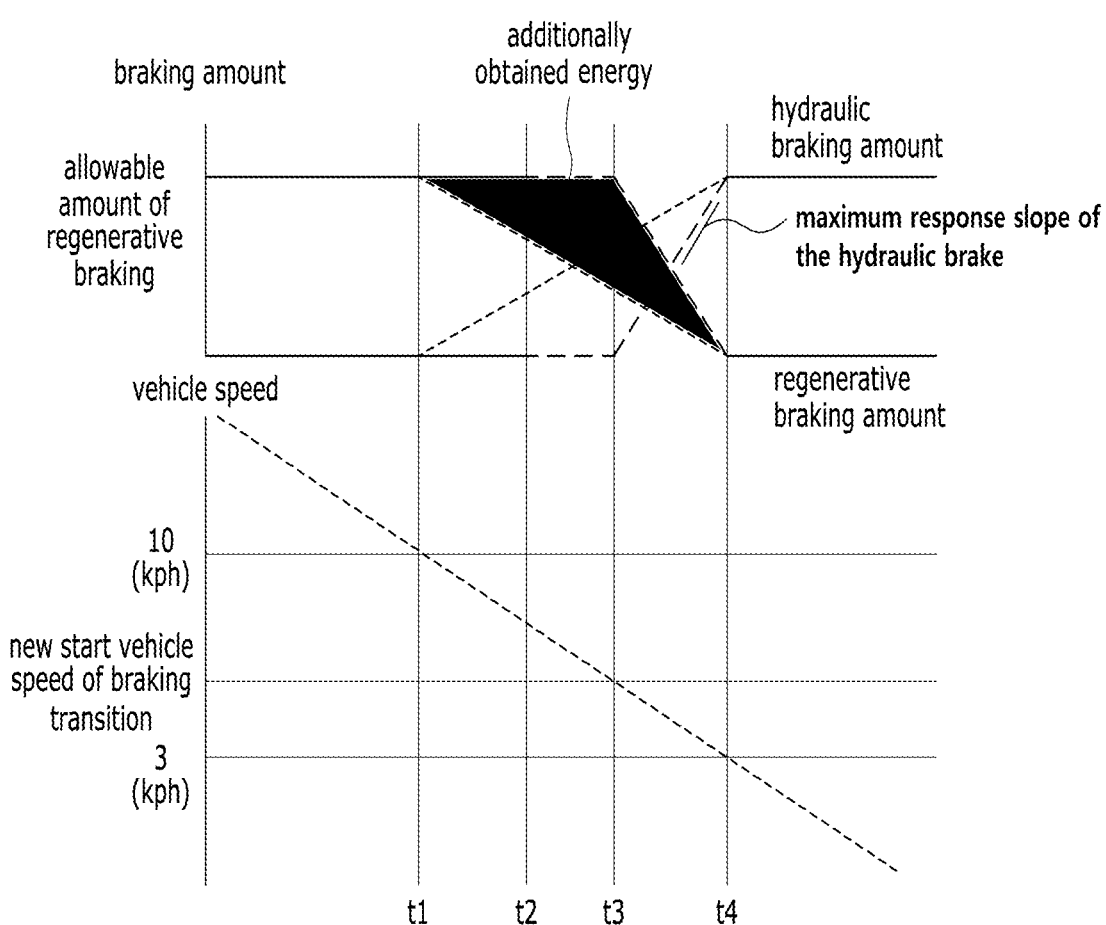
FIG. 2 is a view for explaining the concept of braking transition according to various exemplary embodiments of the present invention.

FIG. 2 is a view for explaining the concept of braking transition according to various exemplary embodiments of the present invention. In FIG. 2, it is assumed that the vehicle speed at which the braking transition is completed is 3 kph.

Referring to FIG. 2, when the braking transition starts at a time when a speed is decelerated to 10 kph in a light braking situation as described above with reference to FIG. 1, a regenerative braking amount decreases from t1. However, even if the braking transition starts from t3, it is possible to obtain additional regenerative braking energy compared to general control as long as the responsiveness of hydraulic brake is guaranteed. Accordingly, the exemplary embodiment suggests determining a new start vehicle speed of braking transition configured for satisfying a target complete vehicle speed of braking transition based on a maximum response slope of the hydraulic brake, and starting the braking transition at the determined start vehicle speed, so that more regenerative braking energy may be obtained.

Before describing a method of determining a start vehicle speed of braking transition in detail, a vehicle configuration to which various exemplary embodiments of the present invention may be applied will be described with reference to FIG. 3.

Figure 3:
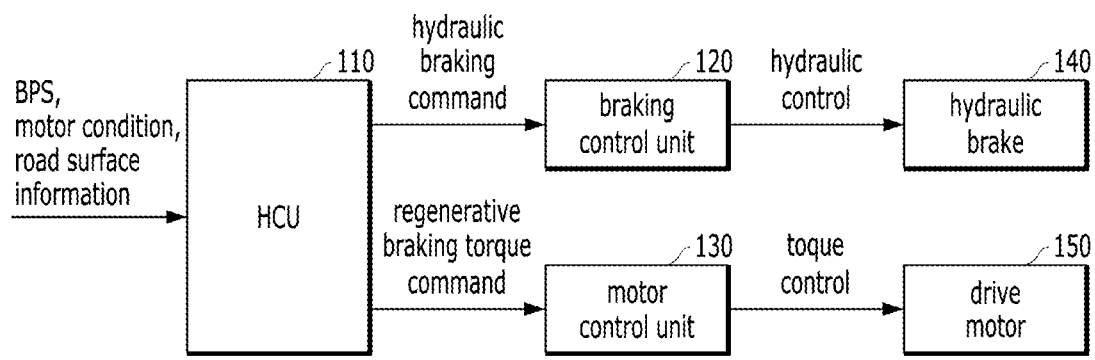
FIG. 3 shows an example of a configuration of an electrified vehicle according to various exemplary embodiments of the present invention.

FIG. 3 shows an example of a configuration of an electrified vehicle according to various exemplary embodiments of the present invention.

In FIG. 3, a hybrid vehicle (HEV) is assumed as an example of an electrified vehicle, and the components (e.g., engine, engine controller, etc.) not directly related to the exemplary embodiment of the present invention are omitted.

Referring to FIG. 3, the electrified vehicle includes a hybrid control unit (HCU) 110, a braking control unit 120, a motor control unit (MCU) 130, a hydraulic brake 140, and a drive motor 150.

The hybrid control unit 110 functions as a host control unit for various control units that directly control powertrain components by performing judgment and determination necessary for driving mode switching control and distribution of driving force between the engine and motor, and performs overall control over the powertrain of the hybrid vehicle. In connection with the exemplary embodiment, the hybrid control unit 110 may include as input information a brake pedal operation amount or a brake request from another controller (e.g., advanced driver assistance system (ADAS), autonomous driving controller, etc.), a vehicle speed, state information of the drive motor 150, and road surface information. In order that a new start vehicle speed of braking transition configured for satisfying a target complete vehicle speed of braking transition is determined based on this input information, and the braking transition is started if the determined start vehicle speed of braking transition is reached, the hybrid control unit 110 can have the hydraulic braking command transmitted to the braking control unit 120 and the regenerative braking torque command transmitted to the motor control unit 130 as output values.

The braking control unit 120 determines a required braking amount based on the value of a brake pedal position sensor (BPS) and informs it to the hybrid control unit 110, and can control the hydraulic brake 140 so that the hydraulic braking amount is executed in the hydraulic brake 140 according to the hydraulic braking command of the hybrid controller 110. Depending on the implementation, the required braking amount may be determined by the hybrid control unit 110. In implementation, the braking control unit 120 may be implemented in a form of an integrated Brake Assist Unit (iBAU), but is not limited thereto.

The motor control unit 130 may provide state information (e.g., temperature, speed, etc.) of the drive motor 150 to the hybrid control unit 130, and according to the torque command transmitted from the hybrid control unit 110, the drive motor 150 may be controlled.

As described above, a hybrid vehicle is assumed in FIG. 3, but the exemplary embodiment is not limited to the type and may be applied as long as the electrified vehicle has an electric motor as a driving source. The hybrid control unit 110 may be replaced by another controller according to the type of the electrified vehicle. For example, in the case of an electric vehicle (EV), the hybrid control unit 110 may be replaced with a vehicle control unit (VCU).

Hereinafter, a braking control process including the determination of a start vehicle speed of braking transition according to an exemplary embodiment based on the above-described vehicle configuration will be described with reference to FIG. 4.

Figure 4:
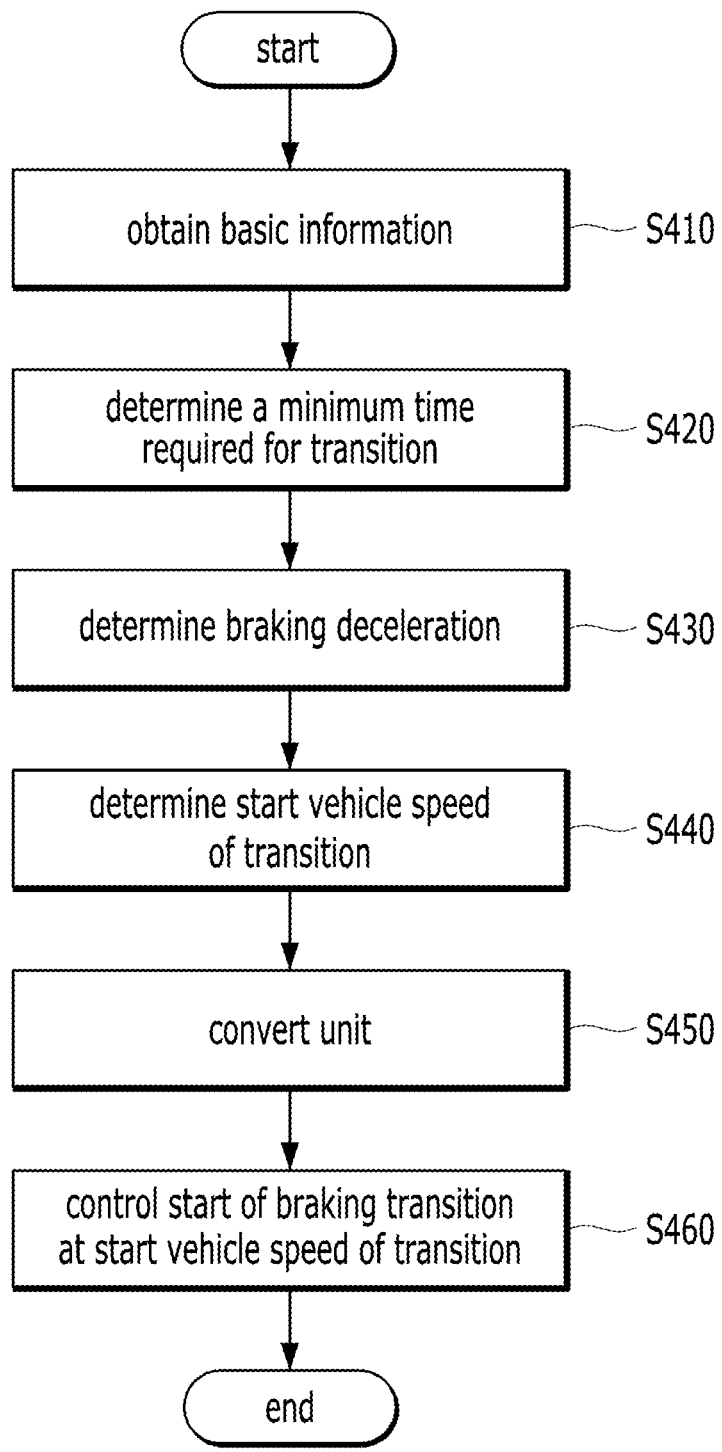
FIG. 4 is a flowchart illustrating an example of a braking control process according to various exemplary embodiments of the present invention.

FIG. 4 is a flowchart illustrating an example of a braking control process according to various exemplary embodiments of the present invention.

Referring to FIG. 4, first, the hybrid control unit 110 may obtain the basic information necessary for determining a start vehicle speed of braking transition (S410).

The basic information may include a required braking amount, an allowable amount of regenerative braking, a maximum response slope of the hydraulic brake 140, a road surface inclination, and a road surface friction coefficient.

The required braking amount may be determined based on the BPS value or may be transmitted from another control unit. The allowable amount of the regenerative braking may be determined based on the motor state information transmitted from the motor control unit 130, and here, battery state (SOC, temperature, etc.) may be further considered.

The maximum response slope is a slope corresponding to the increase amount of braking torque per hour at which the hydraulic brake 140 can stably follow the control of the braking control unit 120, and may be a predetermined value by hardware specifications and tests of the hydraulic brake 140.

The road surface slope may be obtained from the vehicle's tilt sensor, and the road surface friction coefficient can refer to the road type obtained from a navigation system, or be obtained based on the wheel slip generation torque obtained from an electronic stability control (ESC), but it is exemplary and is not necessarily limited thereto.

Of course, it may be noted that when the required braking amount is obtained, the regenerative braking has already been initiated to satisfy the required braking amount.

When the basic information is obtained, the hybrid control unit 110 may determine a minimum time required for transition, which is a minimum time required for the braking transition from regenerative braking to hydraulic braking, based on the maximum response slope (S420). The minimum time required for transition may be obtained by dividing the allowable amount of the regenerative braking by the maximum response slope.

Next, braking deceleration may be determined by the hybrid control unit 110 based on a required braking amount, vehicle specification, and road surface condition (S430). The braking deceleration is the sum of the deceleration by the execution of the required braking amount and the friction deceleration by the friction between a road surface and a wheel (i.e., tire). The deceleration by the execution of the required braking amount may be obtained by dividing the required braking amount by a vehicle mass, and the friction deceleration may be obtained by dividing a normal force on the road surface of a vehicle by the vehicle mass. The normal force on the road surface of the vehicle may be obtained as "the friction coefficient between the road surface and the wheel*vehicle mass*gravitational acceleration*cosine value of the road surface slope".

Next, in the hybrid control unit 110, a start vehicle speed of transition may be determined based on the minimum time required for transition, the braking deceleration, and the end vehicle speed of braking transition (S440). The start vehicle speed of transition may be obtained by adding the end vehicle speed of braking transition to the product of the braking deceleration and the minimum time required for transition. Here, the end vehicle speed of braking transition may be a predetermined value.

If the unit of the minimum time required for transition is a second (s), the unit of braking deceleration is m/s2, and the unit of the end vehicle speed of braking transition is m/s, the unit of the start vehicle speed of braking transition is m/s. Accordingly, the hybrid control unit 110 may change the unit of the vehicle speed to kph unit (or mph depending on a country) (S450).

When the end vehicle speed of braking transition is obtained, the hybrid control unit 110 can transmit a corresponding braking amount command to each of the braking control unit 120 and the motor control unit 130 so that the braking transition is performed as the end vehicle speed of braking transition is reached after the regenerative braking starts (S460). At this time, the hybrid control unit 110 may output a braking amount command so that the hydraulic braking amount increases and the regenerative braking amount decreases along the maximum response slope.

According to the exemplary embodiments of the present invention described so far, an effect of improving fuel economy may be expected by maximizing regenerative braking energy during regenerative braking, and an effect of improving fuel economy leads to an improvement in the marketability of a vehicle.

The present invention described above may be implemented as a computer-readable code on a medium on which a program is recorded. The computer-readable medium includes all types of recording devices that store computer system-readable data. As examples of computer-readable media, there are a hard disk drive (HDD), a solid state disk (SSD), a silicon disk drive (SDD), ROM, RAM, CD-ROM, a magnetic tape, a floppy disk, an optical data storage device, etc.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A braking control method of an electrified vehicle provided with an electric motor as a driving source thereof, the braking control method comprising:
    determining, by a controller, a required braking amount based on a value of a brake pedal position sensor (BPS) and starting regenerative braking when the required braking amount is determined;
    determining, by the controller, a minimum transition time, which is a minimum time required for braking transition from the regenerative braking to hydraulic braking, based on a maximum response slope which is a maximum slope corresponding to a largest rate of change of braking torque per hour of a hydraulic braking device of the vehicle, to obtain additional regenerative braking energy;
    determining, by the controller, braking deceleration according to the required braking amount and a road surface condition;
    determining, by the controller, a start vehicle speed of the braking transition based on the minimum transition time, the braking deceleration, and an end vehicle speed of the braking transition; and
    starting, by the controller, the braking transition when the start vehicle speed of the braking transition is reached during the regenerative braking.

2. The braking control method of claim 1, wherein the starting the braking transition includes controlling a hydraulic braking amount of the hydraulic braking device to increase and a regenerative braking amount to decrease along the maximum response slope.

3. The braking control method of claim 1, wherein the starting regenerative braking is performed in consideration of an allowable amount of the regenerative braking.

4. The braking control method of claim 3, wherein the minimum transition time is obtained by dividing the allowable amount of the regenerative braking by the maximum response slope.

5. The braking control method of claim 1, wherein the determining braking deceleration includes summing a first deceleration by an execution of the determined required braking amount and a second deceleration that is a frictional deceleration according to the road surface condition.

6. The braking control method of claim 1, wherein the determining start vehicle speed of braking transition includes determining the starting vehicle speed of the braking transition by adding a preset end vehicle speed of the braking transition to a product of the braking deceleration and the minimum transition time.

7. A non-transitory computer-readable recording medium which stores a program for executing the braking control method of the electrified vehicle according to claim 1.

8. An electrified vehicle provided with an electric motor as a driving source thereof, the electrified vehicle comprising:
a hydraulic braking device;
a first controller electrically connected to the hydraulic braking device and configured to control the hydraulic braking device;
a second controller electrically connected to the electric motor and configured to control the electric motor; and
a third controller electrically connected to the first and second controllers and configured to:
determine a required braking amount based on a value of a brake pedal position sensor (BPS) and
control the first and second controllers so that regenerative braking is started when the required braking amount is determined,
determine a minimum transition time, which is a minimum time required for braking transition from the regenerative braking to hydraulic braking, based on a maximum response slope which is a maximum slope corresponding to a largest rate of change of braking torque per hour of the hydraulic braking device, to obtain additional regenerative braking energy,
determine braking deceleration according to the determined required braking amount and a road surface condition,
determine a start vehicle speed of braking transition based on the minimum transition time, the braking deceleration, and an end vehicle speed of the braking transition, and
start the braking transition upon determining that the start vehicle speed of the braking transition is reached during the regenerative braking.

9. The electrified vehicle of claim 8, wherein the third controller is configured to control the first and second controllers so that a hydraulic braking amount of the hydraulic braking device increases and a regenerative braking amount decreases according to the maximum response slope.

10. The electrified vehicle of claim 8, wherein the third controller is configured to control to start the regenerative braking in consideration of an allowable amount of the regenerative braking.

11. The electrified vehicle of claim 10, wherein the third controller is configured to determine the minimum transition time by dividing the allowable amount of the regenerative braking by the maximum reaction slope.

12. The electrified vehicle of claim 8, wherein the third controller is configured to determine the braking deceleration by summing a first deceleration by the execution of the determined required braking amount and a second deceleration that is a friction deceleration according to the road surface condition.

13. The electrified vehicle of claim 8, wherein the third controller is configured to determine the start vehicle speed of the braking transition by adding a preset end vehicle speed of the braking transition to a product of the braking deceleration and the minimum transition time.

* * * * *